Figure 2:
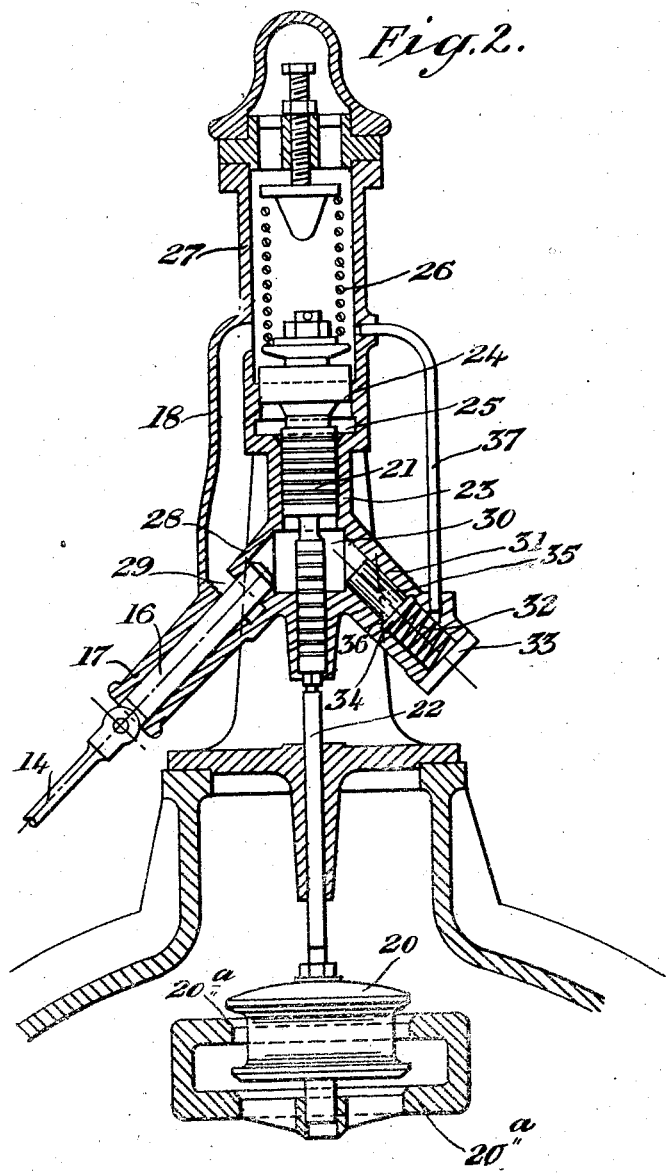

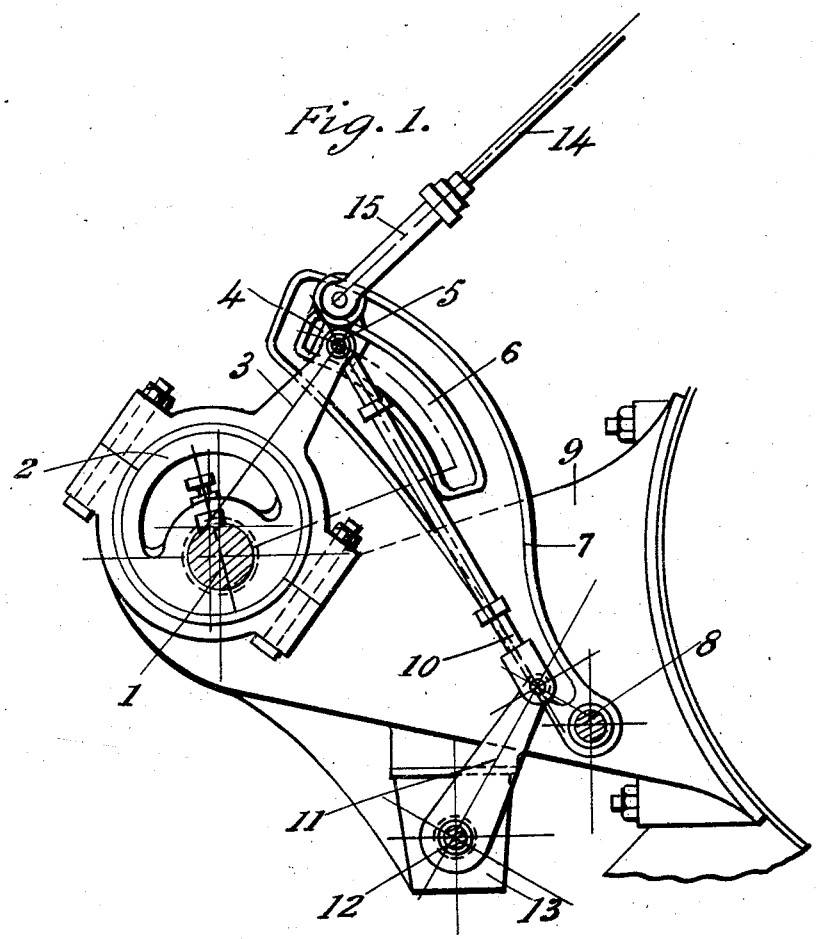

April 6, 1926.
H. PILLING
1,580,077
OPERATION OF VALVES BY FLUID PRESSURE
Original Filed Sept. 8, 1920   3 Sheets-Sheet 2
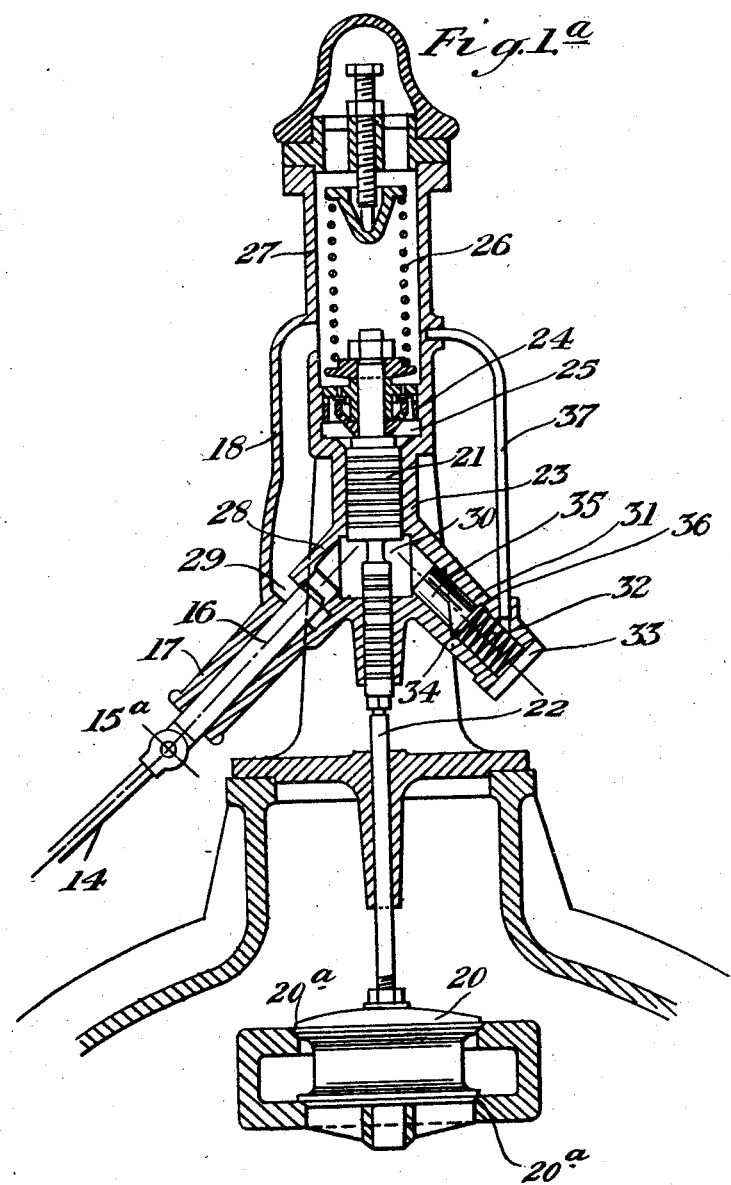
Inventor
Henry Pilling
By [signature]
Attorney April 6, 1926.

H. PILLING 1,580,077

OPERATION OF VALVES BY FLUID PRESSURE

Original Filed Sept. 8, 1920    3 Sheets-Sheet 3

Inventor
Henry Pilling
By
Attorney

Patented Apr. 6, 1926.

1,580,077

UNITED STATES PATENT OFFICE.

HENRY PILLING, OF CHORLTON-CUM-HARDY, ENGLAND.

OPERATION OF VALVES BY FLUID PRESSURE.

Original application filed September 8, 1920, Serial No. 409,001. Divided and this application filed January 24, 1922. Serial No. 531,387.

*To all whom it may concern:*

Be it known that I, HENRY PILLING, a subject of the King of Great Britain, residing in Chorlton-cum-Hardy, England, have invented certain new and useful Improvements in or Relating to the Operation of Valves by Fluid Pressure, of which the following is a specification.

The invention relates to the mechanism of valve gears employing the hydraulic principle of transmitting the forces required to operate the valves of gas, oil or steam engines and consists in improvements in this mechanism. Such valves may be inlet valves which usually open at a fixed point of the engine stroke and close according to the load or other working requirements under the influence of a governor or by hand adjustment. Or the valves, as in the case of uniflow steam engines, may be exhaust or compression release valves which require a variable duration of opening according to the compression to be obtained. For engines of this class more especially those, such as uniflow engines, in which the inlet valve is only open for a very short time, it is advisable to use small pumps with high pumping pressure and to reduce to the lowest dimensions the length of the pipe connection so that the minimum mass of liquid is set in motion at each pulsation.

The duration of the period during which the valve is open can be adjusted according to the load or other conditions, for example, an exhaust valve may be held open for a varied period or an inlet valve may be operated so as to give a fixed lead or point of opening and in addition a variable cut off or closure point.

According to the invention the time during which the valve is held open is adjusted by varying the stroke of a plunger, actuating fluid under pressure to open the valve. The stroke is varied according to the position in a curved slot of a block reciprocated by an eccentric or other equivalent device.

An example of a valve operated according to the invention is shown in the accompanying drawing in which Figs. 1 and 1ª, read together, are an elevation mainly in section, showing the device when the valve is about to open, and Fig. 2 is a similar view with the valve fully open.

1 is a spindle driven in any suitable manner by the engine, 2 an eccentric on the spindle 1, 3 a rod reciprocated by the eccentric, 4 a block pivoted to an eye 5 at the end of the rod 3. The block 4 is displaceable in a slot 6 of a curved lever 7 mounted on a pivot 8 secured to a bracket 9 of the engine framing. The slot 6 is formed as the arc of a circle struck approximately from the centre of the eccentric 2.

Also pivotally attached to the block 4 is a rod 10, the lower end of which is pivoted to a lever 11 secured to a spindle 12 mounted in an extension 13 of the bracket 9. The block 4 can be moved into different positions in the slot 6 by rotating the lever 11 either manually or through the governor of the engine.

A rod 14 is secured to a forked arm 15 pivotally mounted near the free end of the curved lever 7. The rod 14 reciprocates as the lever 7 oscillates about the pivot 8 and the action of the block 4 and the extent of the stroke of the rod 14 depends upon the position of the block 4 in the slot 6 of the lever 7 as controlled by the lever 11.

The rod 14 is pivoted at 15ª to the plunger 16 reciprocating in a cylindrical guide 17 formed by an extension of the casing 18.

The valve 20 to be operated by the fluid pressure produced by the plunger 16 normally rests on the seating 20ª of a casing connected to the cylinder head or other part of the engine with which the valve is in connection. A piston 21 connected to the valve stem 22 is adapted to slide in a cylinder 23 forming part of the casing 18. A dash pot 24 of known construction secured to the piston 21 slides in an extension 25 of the cylinder 23 and serves to damp the movements of the piston when the valve 20 closes, as described in the co-pending specification of which the Serial No. is 409,001. An adjustable spring 26 contained in a vertical extension 27 of the casing returns the valve to its seating.

In the interior of the casing and in connection with the walls of the cylinder 23 there is a barrel 28 in which the plunger 16 enters in its forward stroke. The casing 18 serves as a reservoir for the oil or other liquid by which the valve is operated and a passage 29 is provided in the interior of the casing communicating with the inlet end of the barrel 28. Liquid admitted by this passage to the barrel is forced on the forward stroke of the plunger 16 into a chamber 30 below the piston 21 and thereby raises the piston and opens the valve 20.

As soon as the plunger on the backward stroke opens the connection between the passage 29 and the barrel 28, the pressure is released and the valve closes under the action of the spring 26.

A cylindrical extension 31 of the casing is in connection with the chamber 30 and a spring 32 inserted in the extension is held at one end against a cover 33 and at the other end presses against a collar 34 of a cylindrical plug 35 fitting snugly in the slightly reduced portion of the extension adjoining the chamber 30. Should any excessive pressure at any time arise in the chamber the plug moves outwards against the resistance of the spring and moderates the force of the blow exerted on the valve 20. The collar 34 normally rests against a ledge 36 formed by the change of diameter of the cylinder 31.

Any oil passing the plug is conveyed by a pipe 37 to the chamber above the dash pot, which is in communication with the main oil reservoir within the casing 18.

This application is a division of application Ser. No. 409,001, filed Sept. 8, 1920; Patent No. 1,443,239, issued Jan. 23, 1923.

Having thus described the nature of the said invention and the best means I know of carrying the same into practical effect, I claim:—

1. In a valve operating mechanism for an engine, a liquid-containing casing; a cylinder within and integral with said casing; a piston in said cylinder; a piston rod; a valve secured to said piston rod; a barrel integral with said casing; a plunger reciprocating in said barrel, said plunger alternately forcing liquid into said cylinder from said casing to actuate said piston to open said valve, an extension formed on said casing; a spring in said extension operating to close said valve; means to reciprocate said plunger; and means to vary the stroke of said plunger.

2. In a valve operating mechanism for an engine, a liquid-containing casing; a cylinder within and integral with said casing; a piston in said cylinder; a piston rod; a valve secured to said piston rod; a barrel integral with said casing; a plunger reciprocating in said barrel, said plunger alternately forcing liquid into said cylinder from said casing to actuate said piston to open said valve; an extension formed on said casing; a spring in said extension operating to close said valve; a dash pot in said extension damping the movements of said piston; means to reciprocate said plunger; and means to vary the stroke of said plunger.

3. In a valve operating mechanism for an engine, a liquid-containing casing; a cylinder within and integral with said casing; a piston in said cylinder; a piston rod; a valve secured to said piston rod; a barrel integral with said casing; a plunger reciprocating in said barrel, said plunger alternately forcing liquid into said cylinder from said casing to actuate said piston to open said valve; an extension formed on said casing; a spring in said extension operating to close said valve; a dash pot in said extension damping the movements of said piston; and means for preventing undue pressure in said cylinder, said means comprising a second extension formed on said casing, a plunger slidable outwards in said second extension, and a spring resisting said outward movement of said plunger; means to reciprocate said plunger, and means to vary the stroke of said plunger.

4. In a valve operating mechanism for an engine, a liquid-containing casing; a cylinder within and integral with said casing; a piston in said cylinder; a piston rod; a valve secured to said piston rod; a barrel integral with said casing; a plunger reciprocating in said barrel, said casing having communication with said cylinder; means for reciprocating said plunger to open and close communication between said casing and said cylinder; means for altering the stroke of said plunger; an extension formed on said casing; and a spring enclosed in the extension of said casing and connected to said piston for closing said valve.

5. In a valve operating mechanism for an engine, a liquid-containing casing; a cylinder within and integral with said casing and having communication with the latter; a piston in said cylinder; a piston rod; a valve secured to said piston rod; a barrel integral with said casing; a plunger reciprocating in said barrel; means for reciprocating said plunger to open and close communication between said cylinder and casing; means for altering the stroke of said plunger; an extension formed on said casing; a spring enclosed in the extension of said casing and connected to said piston for closing said valve; means for damping the movement of said piston; and means for preventing undue liquid pressure in said cylinder.

In testimony whereof I have signed my name to this specification.

HENRY PILLING.